United States Patent [19]

VanHoose

[11] Patent Number: 4,773,011

[45] Date of Patent: Sep. 20, 1988

[54] METHOD OF SURVEYING, SELECTING, EVALUATING, OR SERVICING THE TIRES OF VEHICLES

[75] Inventor: John S. VanHoose, Medina, Ohio

[73] Assignee: The Goodyear Tire & Rubber Company, Akron, Ohio

[21] Appl. No.: 823,170

[22] Filed: Jan. 27, 1986

[51] Int. Cl.⁴ .............................................. G06F 15/20
[52] U.S. Cl. .................................. 364/424.03; 73/146
[58] Field of Search ............... 364/424, 464, 709, 715, 364/550–552; 73/146, 146.4, 146.5

[56] References Cited

U.S. PATENT DOCUMENTS

| | | | |
|---|---|---|---|
| 4,090,247 | 5/1978 | Martin | 364/709 |
| 4,387,296 | 6/1983 | Newell et al. | 364/464 |
| 4,434,652 | 3/1984 | Christie | 73/146 |
| 4,435,769 | 3/1984 | Nagano et al. | 364/464 |
| 4,440,018 | 4/1984 | Christie | 73/146 |
| 4,523,297 | 6/1985 | Ugon et al. | 364/709 |
| 4,674,056 | 6/1987 | Goodfellow | 364/464 |

Primary Examiner—Gary Chin
Attorney, Agent, or Firm—R. J. Slattery, III

[57] ABSTRACT

A method of optimizing the operation of a vehicle or a fleet of vehicles by gathering data, and utilizing a computer. The data includes the number and type of tire positions per vehicle, the types of tires at each position and the cost of such types of tires. The computer is used to optimize the operation by determining at least one of the following: the type of tire to be used at each position, the suitable tread depths for removal of tires from one tire position to another, a tire rotation sequence for the transfer of tires. This method further provides for gathering data by surveying a fleet of vehicles through the use of a portable hand held computer.

11 Claims, 5 Drawing Sheets

FIG.1

TRACTOR MENU

Select # of Drive Axles:

Press FUNCTION Key:

F1=1 AXLE, F2=2 AXLES, F3=3 AXLES
F4=ERASE, F10=CONTINUE

FIG.2

DRIVEN AXLE MENU
Select Axles to DRIVE Tractor:

Press FUNCTION Key:

F1=#1, F2=#2, F3=#1 & #2
F4=To ERASE, F10=To CONTINUE

FIG.3

TRACTOR VERIFICATION MENU
Select the following:

Press FUNCTION Key:

F1=to CORRECT #, F2=to REBUILD,
F10=to CONTINUE

METHOD OF SURVEYING, SELECTING, EVALUATING, OR SERVICING THE TIRES OF VEHICLES

BACKGROUND OF THE INVENTION

This invention provides a method for surveying, selecting, evaluating and/or servicing the tires of a vehicle or a fleet of vehicles. More specifically this invention provides a method for developing a service schedule for servicing the tires of a vehicle by optimizing the operation of the types of tires used and the manner in which they are used through the use of a computer. Furthermore, this invention provides a method for gathering vehicle data, including tire data, for a vehicle or a fleet of vehicles through the use of a portable hand held computer in the field.

In general in the past when the tire needs or requirements of a vehicle were to be evaluated an individual or individuals would visually inspect the tires or in a large fleet only a sampling of tires. The inspection may or may not involve some checking of inflation pressures and tread depth measurements. The time required to inspect a vehicle manually could be quite time consuming and usually resulted with only a summary of the numbers of tires that needed to be replaced. There was usually no evaluation as to how the tires were currently being used such as the type of tires to be used, when a tire was to be removed and the rotation sequence once removed, nor was there a detailed tabulation or summary of every vehicle within the fleet. This was because the amount of time and effort was prohibitive. Furthermore, the measurements of the tread depths and the air pressure when taken manually can also be quite time consuming and can result in errors either in reading or in transcribing to a data sheet.

It is accordingly an object of this invention to eliminate the deficiencies of the prior art.

BRIEF DESCRIPTION OF THE DRAWINGS

The following is a brief description of the drawings in which like parts bear like reference numerals and in which.

SUMMARY OF THE INVENTION

This invention provides for a computerized method for use in evaluating the operation, usage or selection of tires with respect to motor vehicles. This invention may be used to evaluate only one vehicle or a whole fleet of vehicles, such as trucking companies, cab companies, etc.

This method provides for developing a schedule or tabulation for servicing the tires of a vehicle or a fleet of vehicles. This is accomplished by gathering and inputting data into a computer which optimizes at least part of the operation of the vehicle or the fleet of vehicles. This can be accomplished by determining the optimum types of tires to be used, and/or the suitable tread depths for removal of tires from one position to another, and/or determining a tire rotation sequence for the transfer of tires. This method further provides for a method of performing a survey of a vehicle or a fleet of vehicles by gathering some of the data required above through the use of a portable hand held computer. This data can be transmitted to a main data base and when compared to subsequent data may be used to determine wear rates for various types of tires and for other statistical analysis.

It is, therefore, an object of this invention:

(1) to provide an analysis for selecting tires to be used on a vehicle;

(2) to provide an analysis illustrating the effects of changing current operating practices such as the tire rotation;

(3) to provide a schedule for servicing vehicles by determining at least one of the following: the type of tires to be used at each tire position, the suitable tread depths for removal of tires from one tire position to another, a tire rotation sequence for the transfer of tires;

(4) to reduce the time and increase the accuracy of analysing a fleet of vehicles;

(5) to provide a method, utilizing a hand held computer, of surveying a fleet of vehicles;

(6) establish a tire data base for future tire performance projections and statistical analysis;

(7) transmitting data to a main database for analysis.

DESCRIPTION OF THE INVENTION

I. A Method of Selecting or Servicing the Types of Tires Used by Vehicles

The method of selecting or servicing the types of tires used by a vehicle or a fleet of vehicles in accordance with this invention includes accumulating data, inputting this data into a computer, and determining with the aid of the computer the types of tires to be installed at each position of the vehicle and/or how the tires should be serviced. This may include determining when a tire should be removed for transfer to another position or for recapping or for scrapping. This may also include a tire rotation sequence for the transferring of tires from one position to another, or for recapping and reinstalling, or for the removal of the tire for scrapping.

The accumulated data may include overhead costs, vehicle data, and tire data. The overhead costs may include such operating costs as the cost of fuel, the number of flats per year, the cost of repairing flats, and the cost of changing tires. The vehicle data may include the types of vehicles, such as automobiles, straight trucks, cabs, trailers, etc., the average distance traveled per vehicle type, the number of tire positions per vehicle, the different types of tire positions such as steer, drive, trailer, etc., and the total number of vehicles for each vehicle type. The tire data may include the types of tires, such as the size and/or brand type, currently used or to be considered to be used at each of the different tire positions, the cost of these tires, their tread depths and wear rates, and the cost of used tire carcasses. The tire data may further include the tread depth at which tires are currently removed from each tire position and the current rotation sequence used for the transfer of tires. The types of tires may include new tires and those which have been recapped.

Once the data has been entered, the computer can be used to determine the cost of operating a vehicle or a fleet of vehicles. This cost can be used as a reference number in order to optimize the types of tires to be used. The operator may select a different type of tire to be used at one position, such as the steer position and actuate the computer to calculate the cost of operating a vehicle or a fleet of vehicles in this manner. By comparing the operating costs of various types of tires, it can be determined which type of tire should be used at each tire position. In like manner, a different tire rotation sequence and/or different tread depth values may be selected. The computer then may be used to calculate an operating cost based upon these changes and compared with the previous cost. By comparing these operating costs, the optimum tire rotation sequence and/or tread depths may be determined. With these known, a service schedule may be determined in order to remove, install, replace, transfer, recap, scrap and rotate the tires based upon these calculations.

Figure 1:
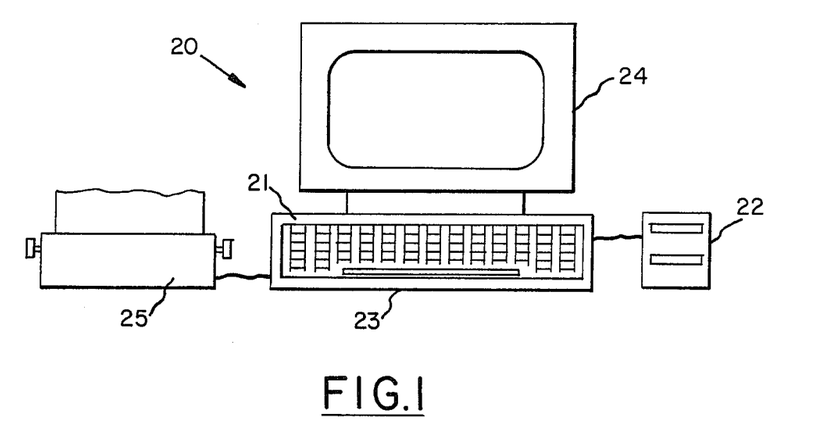
FIG. 1 is a schematic of a computer system to be used in accordance with this invention.

Now, referring to FIG. 1, a preferred computer system shown generally as reference numeral 20 may include a minicomputer, having a central processing unit memory 21 and disk drives 22, a key board 23, a display 24 and printer 25. A commercially marketable system currently is available using an International Business Machines P.C.-XT.

In the preferred embodiment the computer 20 will provide for pictorial prompts for entering the initial vehicle data. Initially a name, such as a fleet name, is entered into the computer through the keyboard 23. A fleet description menu is provided for the different types of vehicles or fleets of vehicles, such as straight, trucks, tractors and trailers, cars, vans, etc.

Figure 2:
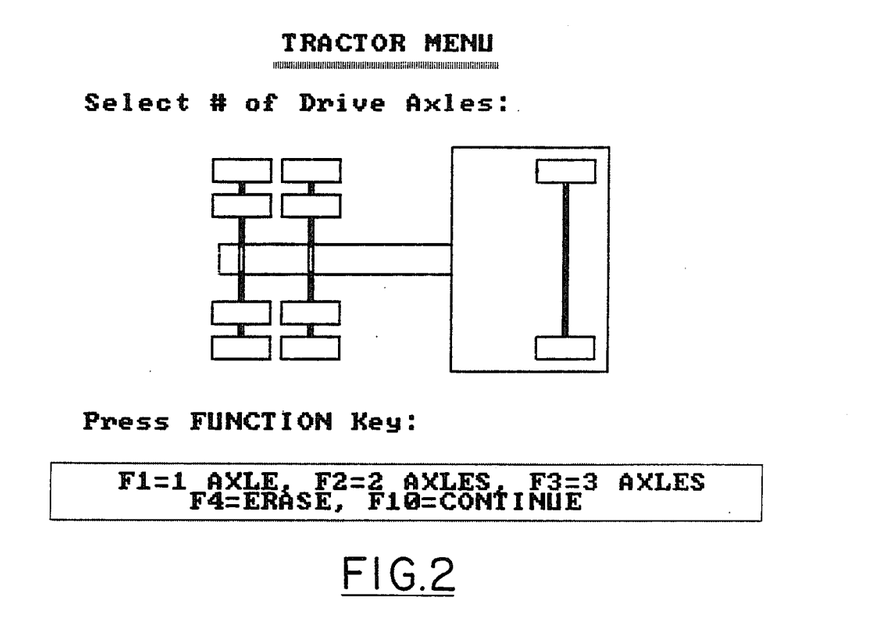
FIGS. 2 through 6 show various examples of displays on the CRT for operation processing. Each vehicle illustrated therein is viewed from the top, these displays are part of a program and data base copyrighted by The Goodyear Tire & Rubber Company.
Figure 3:
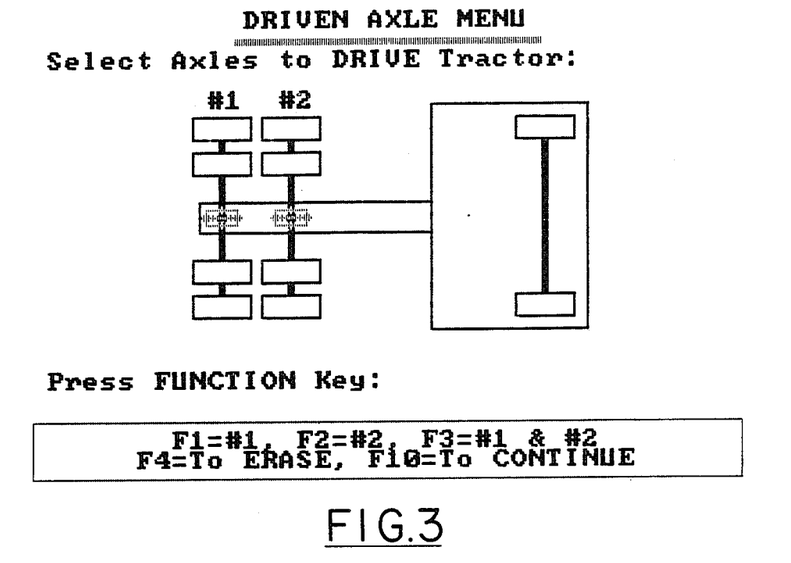
Figure 4:
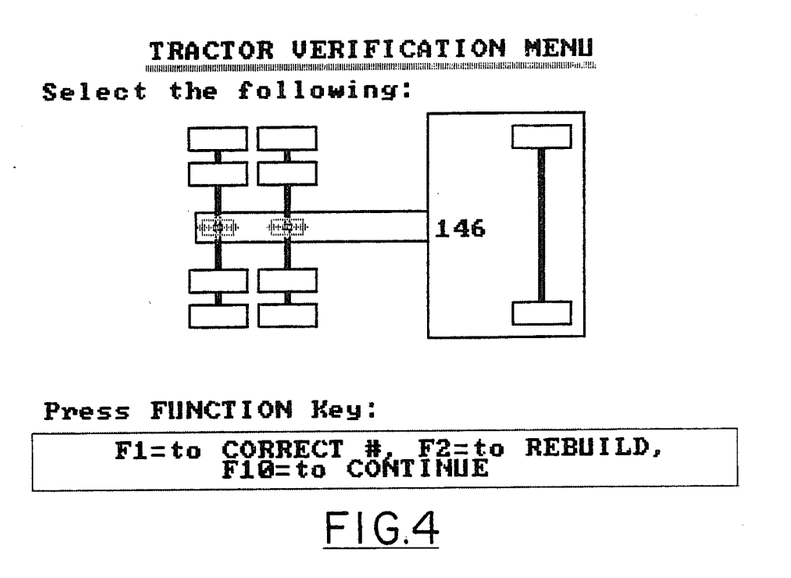
Figure 5:
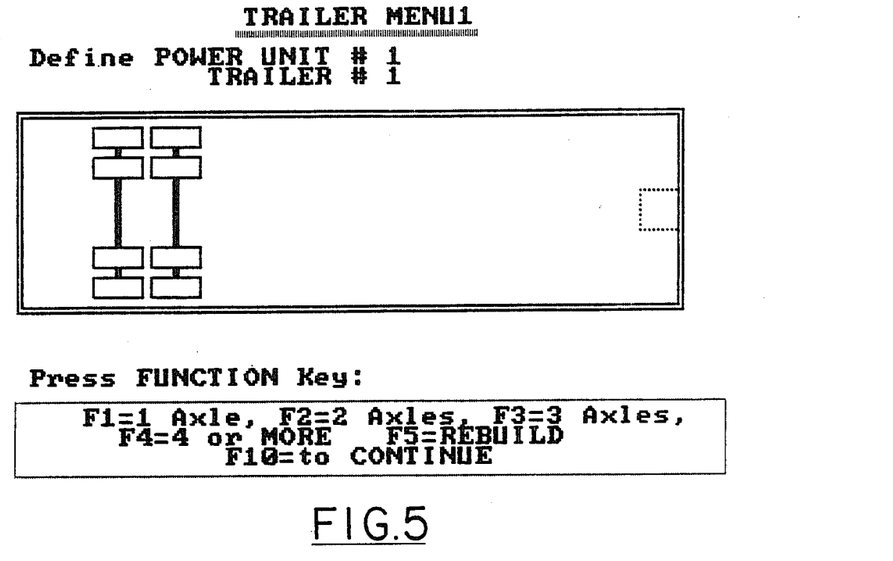
Figure 6:
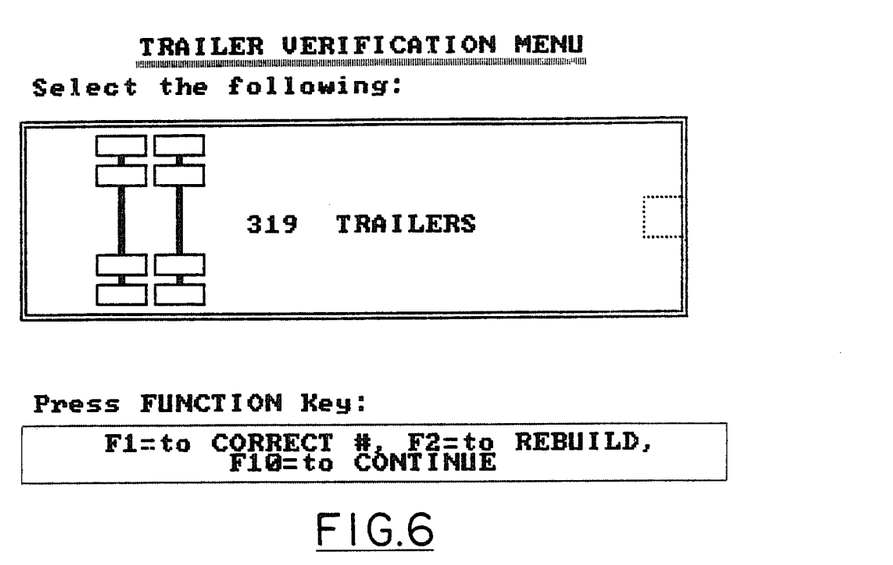

If the tractor menu is selected, the computer will provide prompts to build or model the fleet of vehicles. First, the number of drive axles on the tractor is determined, FIG. 2, then which axle is to drive the power unit or vehicle, FIG. 3, and then the number of vehicles, FIG. 4. Once the tractor modeling is complete, then the computer can be actuated to provide prompts to build or model the trailers of the fleet associated with the first vehicle. First, the number and position of the axles is determined, FIG. 5, and the number of trailers, FIG. 6. This procedure can be continued for each vehicle type until each has been modeled.

Now for each fleet of a given vehicle type, the following overhead data is to be entered into the computer. Usage, flats per year, vehicle miles per gallon, cost of fuel, average cost to fix each flat and the average cost of changing tires. Usage, this is the average number of miles run per month by a vehicle.

Tire data must also be entered for each fleet. For the above example, there are three (3) different tire positions—steer, drive and trailer. The types of tires used at each position may be new tires or tires which have been recapped a first or a second time. A determination must be made as to which type of tire will be used at each of these positions. Once this has been determined, the following data is entered with respect to each tire type: the size of the tire, the brand type, the cost of the tire, the wear rates and the initial tread depth of each type. The wear rate of the tire is the number of miles travelled for each 1/32 inch of wear of the tread.

Figure 7:
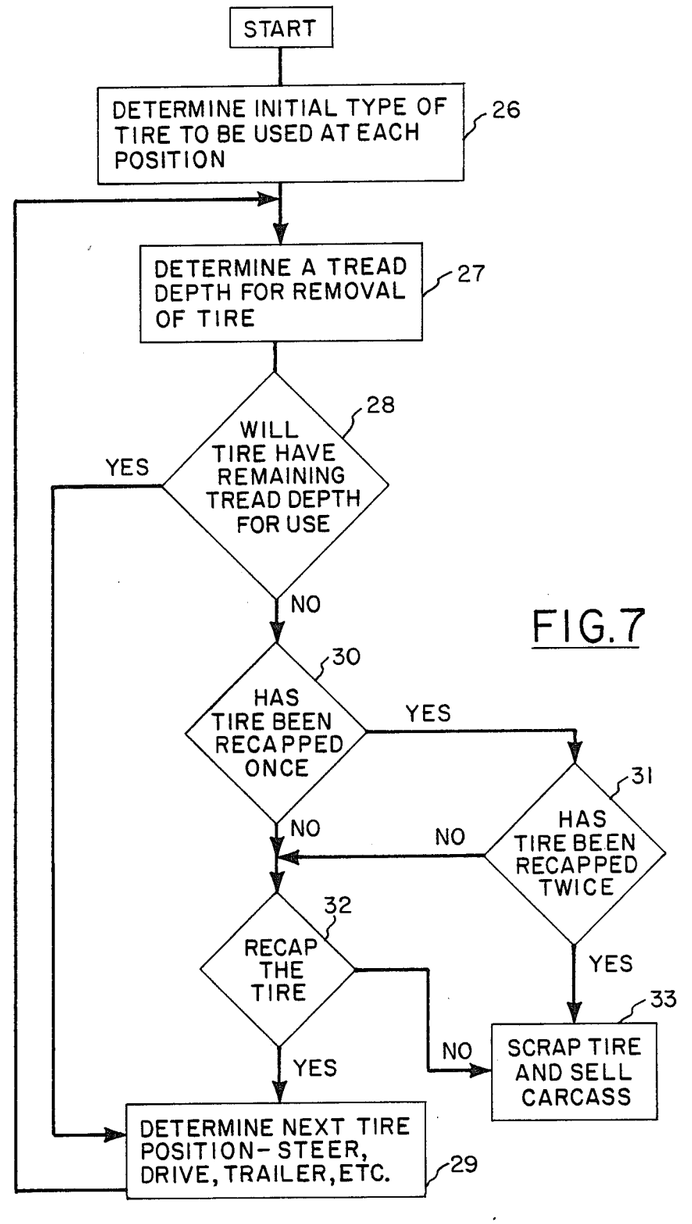
FIG. 7 is a flow chart showing a procedure to determine a tire rotation sequence.

Now referring to FIG. 7, a tire rotation sequence is the path a tire takes from one tire position to another for reinstalling and/or recapping until the tire is eventually scrapped. The tire rotation sequence is determined for each type of tire at each tire position. This is done by first determining the type of tire to be used at each position as shown in block 26 and then at what point will the tire be removed from this position. This may be determined by specifying that when the amount of remaining tread reaches a certain level the tire is to be removed as shown in block 27. Once the tire has been removed, there are three different paths which it may take. It may be sold for its carcass or it may be transferred to another position to be worn out on or it could be recapped and reinstalled at another position. If the tire is not worn out, that is there is enough remaining tread to operate safely, block 28, then it may be reinstalled at another tire position as shown in block 29. If the tire is worn out, then it is recapped for a first or second time or scrapped as shown in blocks 30 through 33. If the tire is recapped then it is reinstalled at another or same tire position as shown in block 29. A new determination is then made as to when the tire is to be pulled or removed, block 27. This loop is continued until the tire is eventually scrapped. This is repeated for each tire at each position on the vehicle. This will result in a tire rotation sequence and/or a determination of the tread depths for the removal of the tires. A tire rotation sequence with suitable tread depths for the removal of the tires from each position of a tractor trailer is shown in Table 1, which is part of a program and data base copyrighted by The Goodyear Tire & Rubber Company. Where the tread depth is in thirty seconds of an inch.

TABLE 1

| STEER ROTATION: | |
|---|---|
| NEW STEER Tire - tread depth | 19 |
| tread used in Steer Position | 14 |
| New Steer worn out on Trailer | 3 |
| Remaining tread is . . . | 2 |
| CAP1 TRAILER Tire - tread depth | 14 |
| tread used in Trailer Position | 12 |
| Remaining tread is . . . | 2 |
| CAP2 TRAILER Tire - tread depth | 14 |
| tread used in Trailer Position | 12 |
| Remaining tread is . . . | 2 |
| Remaining recappable Casing's Sold | |
| DRIVE ROTATION: | |
| NEW DRIVE Tire - tread depth | 19 |
| tread used in Drive Position | 12 |
| New Drive worn out on Trailer | 5 |
| Remaining tread is . . . | 2 |
| CAP1 TRAILER Tire - tread depth | 14 |
| tread used in Trailer Position | 12 |
| Remaining tread is . . . | 2 |
| CAP2 TRAILER Tire - tread depth | 14 |
| tread used in Trailer Position | 12 |
| Remaining tread is . . . | 2 |
| Remaining recappable Casing's Sold | |
| TRAILER ROTATION: | |
| NEW TRAILER Tire - tread depth | 19 |
| tread used in Trailer Position | 17 |
| Remaining tread is . . . | 2 |
| CAP1 TRAILER Tire - tread depth | 14 |
| tread used in Trailer Position | 12 |
| Remaining tread is . . . | 2 |
| CAP2 TRAILER Tire - tread depth | 14 |
| tread used in Trailer Position | 12 |
| Remaining tread is . . . | 2 |
| Remaining recappable Casing's Sold | |

Figure 8:
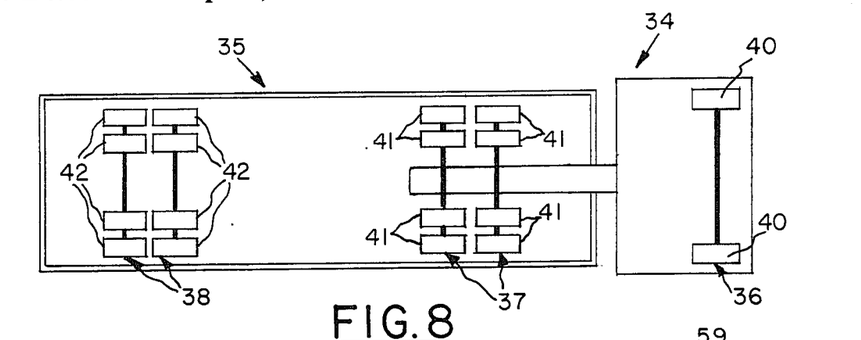
FIG. 8 is a schematic of a tractor trailer viewed from the top for showing the steer, drive and trailer positions.

Table 1 corresponds to the tractor 34 and trailer 35 as shown in FIG. 8. Initially in this case each tire located at the steer 36 and drive 37 positions of the tractor 34 and the trailer positions 38, of the trailer 35 will be new tires. Once the steer tires 40 have been worn 14/32" the tires will be pulled to be reinstalled at one of the trailer positions 38, where it will be used until 2/32" of tread depth remain, at which point it will be recapped for the first time. The tires 40 then will be reinstalled at one of the trailer positions 38 until worn out. The tire then will be recapped a second time and reinstalled at one of the trailer positions 38. The new drive tires 41 will be worn until 7/32" of tread depth remain at which point they will be pulled for installation at one of the trailer positions 38 until the remaining tread depth is 2/32". Afterwards the tires 41 will be pulled and used at one of the trailer positions until they are worn out after the second recapping as the steer 40 tires were. In like manner the new trailer tires 42 will be used at a trailer position 38 until they have been recapped twice.

After all the data has been entered, the computer is actuated to calculate an annual cost based on such data per vehicle or for the fleet. This cost may be optimized by substituting different types of tires for the original ones and changing data associated with these tires such as the wear rate, tread depth and cost data. The computer is actuated again to calculate a cost based on this new data and it is compared with the previous cost. Different tires may be substituted until the operating cost has been optimized. The rotation sequence may also be changed and the computer actuated to calculate the operating cost based on these changes until the operating cost has been optimized. In like manner the depth at which a tire is removed from a position may be changed and the associated operating cost determined until suitable tread depths have been determined. The type of tires, the tread depths and the rotation sequence may either be modified one at a time or in combination. By lowering the operating cost the fleet operation is optimized. Once this has been determined the computer is actuated to either store and/or print the tabularized schedule indicating the type of tires to be used, the number of replacement tires required at each position over a period of time, the tread depths for the removal from vehicle positions and the rotation sequence to be used once the tire has been removed. The computer may also project when these tires are to be removed for rotating, recapping or scrapping. By using this schedule to remove, replace, rotate, recap or scrap the tires, the operation of the fleet will be optimized and thereby lower operations costs.

II. A Tire Survey

An Example for Accumulating Data

The method of selecting or servicing the types of tires used by a vehicle or a fleet of vehicles described herein requires the gathering of information including vehicle and tire data. This data may be gathered from service and purchase records or from the owner and/or operator of the vehicles. However, the following is a method for determining at least some of this data by surveying the fleet or a portion thereof.

Figures 9, 9A, 9B:
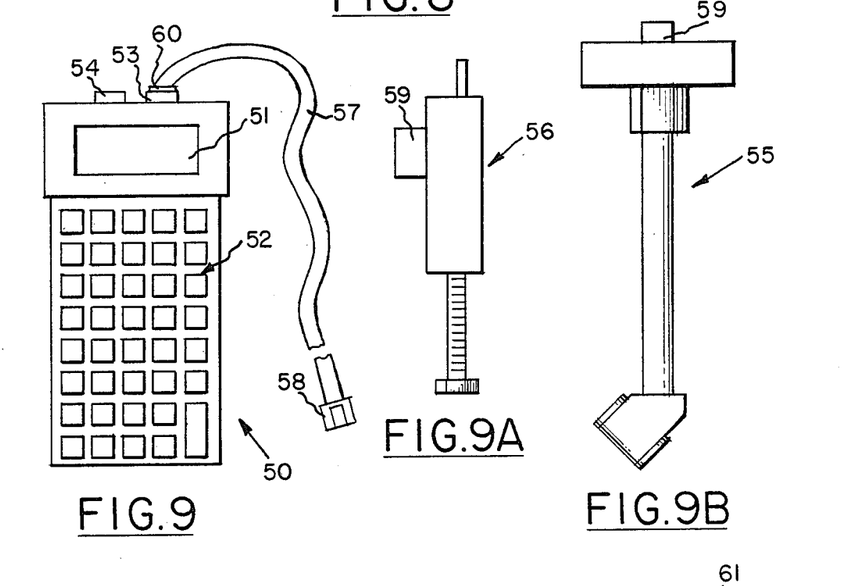
FIG. 9 is a schematic of a portable hand held computer to be used in surveying a vehicle in accordance with this invention.
FIGS. 9A and 9B are a schematic of two transducers to be used with the portable hand-held computer of FIG. 9.

FIG. 9 of the drawings illustrates a portable hand held computer device for performing a tire survey of a vehicle or a fleet of vehicles and is shown generally by numeral 50. The portable hand held computer 50 is provided for use by an individual to assist him in gathering information. The portable hand held computer 50 includes an alphanumeric display means, a memory means and a data entry means. The alphanumeric display means, generally designated as numeral 51, enables an individual to display information to assist him in accomplishing his tasks and to verify the entered data. The memory means (not shown) contains a control program, coded data and a data storage means for temporarily storing data. The data entry means 52, which may be a keyboard, provides for entering data either as coded data or non-coded data into the hand held computer. The data storage means provides for storing the entered data. A portable electrical power means, such as a battery, is also included for supplying electrical power to the various components. A control means is used to control and monitor the various components for transferring data into the storage means, for displaying information on the display means 51 and for transferring data from the storage means.

The portable hand held computer has an output means 53 for transferring stored data to an external device, such as the computer 20 of FIG. 1. It also has an input means 54 for receiving electrical signals from an external device although the input 54 and output 53 menas may be combined to form one input/output port. These devices may send analog signals which may have to be converted to digital signals. Two such devices are a means 55 for measuring the air inflation pressure of the tire and a means 56 such as a depth transducer for measuring the tread depth of the tires as shown in FIGS. 9B and 9A respectively. Either devices, 55 or 56, may be interfaced to the input means 54 by a cable 57 attached at one end 58 to a connector 59 on each device. The other end 60 of the cable 57 attaches to the input means 54. A commercially available hand held computer means 50, such as the "Portable Tele-Transaction Computer", "PTC 701", is available from Telxon Corporation, 3330 W Market Street, Akron, Ohio.

The tire survey of each vehicle is begun by entering vehicle data, including the type of vehicle and the number of tires, into the portable hand held computer. Each tractor, trailer, dolly, etc., is considered a separate vehicle. The hand held computer has nine types of vehicles stored in memory corresponding to a number code. After the hand held computer 50 has provided a prompt on the display means such as "VEHICLE TYPE" the corresponding code number for the vehicle type is entered instead of the literal vehicle. The types of vehicles and the code numbers are:

```
1 - Car
2 - Van
3 - Truck
4 - Dump Truck
5 - Cab Over Tractor
6 - Conventional Tractor
7 - Trailer
8 - Dolly
9 - Bus
```

Other vehicle data may also be entered such as the vehicle identification number, the manufacture of the vehicle, the odometer mileage and the hubometer mileage after a prompt from the hand held computer. Once the above information has been entered, tire data for each tire at each position on the vehicle is entered into the hand held computer.

The sequence or order in which the tire data is obtained for each tire at each position is determined by the hand held computer 50 based upon the vehicle type code and the number of tires. The computer will display on the alphanumeric display means 51 prompts, such as LF (left front) for guiding the individual in the sequence determined by the computer around the vehicle. Once all the tire data for a tire has been entered the computer will provide the next prompt corresponding to the tire data of the next tire to be entered. Table 2 shows the different sequences with the corresponding prompts for various combinations of vehicle type codes and the number of tires on the vehicle. Table 3 provides a definition for each prompt of Table 2 and a reference number corresponding to a tire position of a vehicle 61 illustrated in FIG. 10. The vehicle 61 as shown illustrates a vehicle having the maximum tire positions of 14.

TABLE 2

| No. of Tire | Type of Vehicle | Prompts Will Be |
|---|---|---|
| =2 | | LF RF |
| =4 | LESS THAN 4 | LF LR RR RF |
| =4 | GREATER THAN 3 | LRO LRI RRO RRI |
| =6 | =4 | LCO LRO LRI RRO RRI RCO |
| =6 | =9 | LCO LCI LRO RRO RCO RCI |
| =6 | NOT 4 OR 9 | LF LRO LRI RRO RRI RF |
| =8 | =4 | LF LCO LRO LRI RRO RRI RCO RF |
| =8 | =9 | LF LCO LCI LRO RRO RCO RCI RF |
| =8 | NOT 4 OR 9 | LCO LCI LRO LRI RRO RRI RCO RCI |
| =10 | =4 | LFO LCO LCI LRO LRI RRO RRI RCO RCI RFO |
| =10 | NOT 4 | LF LCO LCI LRO LRI RRO RRI RCO RCI RF |
| =12 | =4 | LF LFO LCO LCI LRO LRI RRO RRI RCO RCI RFO RF |
| =12 | NOT 4 | LFO LFI LCO LCI LRO LRI RRO RRI RCO RCI RFO RFI |
| =14 | | LF LFO LFI LCO LCI LRO LRI RRO RRI RCO RCI RFO RFI RF |

TABLE 3

| Prompt | Description | Reference Number |
|---|---|---|
| LF = | LEFT FRONT | 62 |
| LR = | LEFT REAR | — |
| LRI = | LEFT REAR IN | 68 |
| LRO = | LEFT REAR OUT | 67 |
| LFO = | LEFT FRONT OUT | 63 |
| LCI = | LEFT CENTER IN | 66 |
| LCO = | LEFT CENTER OUT | 65 |
| LFO = | LEFT FRONT IN | 64 |
| RF = | RIGHT FRONT | 75 |
| RR = | RIGHT REAR | — |
| RRI = | RIGHT REAR IN | 70 |
| RRO = | RIGHT REAR OUT | 69 |
| RFO = | RIGHT FRONT OUT | 73 |
| RFI = | RIGHT FRONT IN | 74 |
| RCO = | RIGHT CENTER OUT | 71 |
| RCI = | RIGHT CENTER IN | 72 |

The tire data to be obtained for each tire includes such data as the recommended inflation pressure and the tread depth of each tire. The tire data may also include such data as the type and/or size of the tire bead data, tread data, sidewall data, and valve cap data.

The tire data and most of the vehicle data may be entered into the hand held computer either directly as literal non-coded data or as coded data. In the preferred embodiment, some data will be prestored in memory corresponding to coded data while some memory location corresponding to coded data will be clear. This will allow the operation to enter coded data in place of non-coded data if available. It will also allow the operator to enter data as literal non-coded data to be stored in a clear memory location one time and from that point on the individual will be able to enter the same data by using the corresponding coded data. This provides flexibility by allowing the individual to build his own list of data for each survey. Tables 4 through 7 illustrate tread, sidewall, bead, and valve cap data stored in memory with a corresponding code while Table 8 illustrates having some data, for example, manufacturers of vehicles, stored in memory with some empty locations to be used by the individual to build his own list through the control program.

TABLE 4

| | TREAD DATA |
|---|---|
| 1 = | OK |
| 2 = | CHAMFER WEAR |
| 3 = | RIVER/EROSION |
| 4 = | ERRATIC DEPRESSED WEAR |
| 5 = | CUT |
| 6 = | WIPEOUT |
| 7 = | HEEL & TOE |
| 8 = | GROOVE CRACK |
| 9 = | RIB TEAR |
| 10 = | CHIP/CHUNK |
| 11 = | STONE DRILLING |
| 12 = | FULL SHLDR WEAR |
| 13 = | BRLT EDGE SEP |
| 14 = | HIGH/LOW ECCENTRIC OUT OF ROUND |
| 15 = | BASE LUG CRACK |
| 16 = | CUPPING |
| 17 = | FOREIGN OBJECT |
| 18 = | FEATHER WEAR (TOE) |
| 19 = | ONE SIDED WEAR |
| 20 = | ALTERNATE LUG WEAR |
| 21 = | BRAKE SKID |
| 22 = | SHOULDER SCUFFING |

TABLE 5

| | SIDEWALL DATA |
|---|---|
| 1 = | OK |
| 2 = | SNAG |
| 3 = | SHOULDER SPLIT |
| 4 = | SEPARATION |
| 5 = | CUT |
| 6 = | RADIAL CRACKING |
| 7 = | BRANDING |
| 8 = | WEATHERING |
| 9 = | SIDEWALL DIAGONAL CRACKING |

TABLE 6

| | BEAD DATA |
|---|---|
| 1 = | OK |
| 2 = | FLOW CRACKING |
| 3 = | CHIPPER SEPARATION |
| 4 = | PLY END SEPARATION |
| 5 = | CUT |
| 6 = | RADIAL CRACKING |
| 7 = | CHAFING |
| 8 = | WEATHERING |
| 9 = | PLY BASE BREAK |

TABLE 7

| | VALVE CAP DATA |
|---|---|
| 1 = | STEEL |
| 2 = | NONE |
| 3 = | PLASTIC |
| 4 = | UNAVAILABLE |
| 5 = | NOT TAKEN |

TABLE 7-continued

VALVE CAP DATA

| | |
|---|---|
| 6 = | METAL EXTENSION |

TABLE 8

MANUFACTURER OF VEHICLES

| | |
|---|---|
| 1 = | INT'L HARVESTER |
| 2 = | GENERAL MOTORS |
| 3 = | FREIGHTLINER |
| 4 = | CHEVROLET |
| 5 = | PETERBILT |
| 6 = | UTILITY TRAILER |
| 7 = | REO |
| 8 = | KENWORTH |
| 9 = | FORD |
| 10 = | MACK |
| 11 = | WHITE |
| 12 = | |
| 13 = | |
| 14 = | |
| 15 = | |
| 16 = | |
| 17 = | |
| 18 = | |
| 19 = | |
| 20 = | |

Now again referring to FIG. 10 once the vehicle data has been entered the tire data is entered. The tire survey starts at tire position 62. The hand held computer 50 will provide a prompt of LF TIRE SIZE. The individual will key in first a 1 and then the tire size such as 11R24.5, thereby initializing the tire size code number 1 for that particular tire size. On any subsequent tires being this size the operator will only have to enter this code number. If, however, subsequent tires are different sizes then the individual can initialize the number 2 position, number 3 position and so forth as was done with the first one. The next prompts will be LF Brand/Type, in which the brand or type of tire is entered as above by first initializing a coded position and then entering the literal name.

Figure 10:
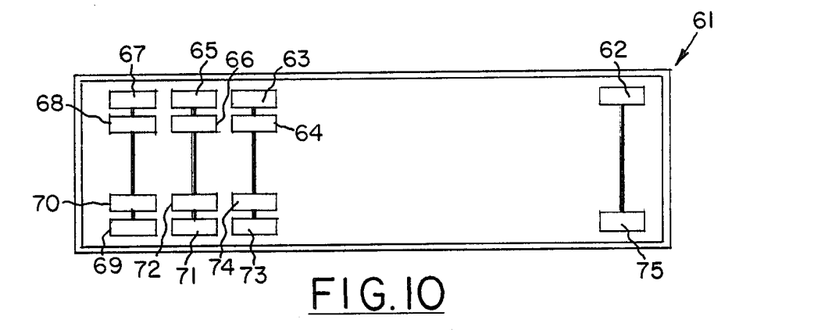
FIG. 10 is a schematic of a vehicle viewed from the top showing various tire positions.

The computer 50 will provide prompts then for recording the recommended inflation pressure and the measured inflation pressure which may be followed by the tread, sidewall, bead and valve cap data in which the coded numbers are entered from Tables 4, 5, 6 and 7, respectively. The tire pressure may be measured and manually keyed into the computer or may be measured using the pressure transducer 55, the cable 57 and the input means 54 of computer 50 as shown in FIG. 9. The computer may also provide prompts for measuring the tread depth of the tires. The tread depth of the first groove is measured at three different points and the lowest reading is recorded. This may be recorded for every groove on the tire. Once the tire data has been completed at this position 62, the computer 50 will provide the next prompt, which for vehicle 61 would be LFO TIRE SIZE, and the above sequence will be repeated for tire position 63. Once all the tire data has been gathered at position 63, the computer will continue to provide prompts until every tire position has been covered. Other data which might be gathered at each tire position is the tread radius, the tire serial number, the construction number, the brand number, and additional notes on the tire or vehicle. Once all the data has been entered for this vehicle the procedure is repeated for all the vehicles to be surveyed. The information gathered by the portable hand held computer is transferred to the mini computer 20 shown in FIG. 1.

The mini computer then is able to use this data for selecting or servicing the types of tires used by different types of vehicles. By taking another fleet survey at a later time and thereby acquiring a larger data base, the computer will be able to determine the wear rates for various types of tires used on this fleet. It may also be able to better determine the miles traveled by the fleet and if the rotation sequence and tread depth recommendations have been followed.

The minicomputer may also be actuated to tabularize and/or summarize the gathered data. It will be able to determine the number of tires which are properly inflated and those which are either under or over inflated and the projected cost in operating the tires in this manner. The computer will be able to determine the number of tires which must be replaced now and it could be used to determine how many will be needing replacement in the near future. The survey data will provide an up-to-date status for each vehicle surveyed and thereby providing a current operating inventory. With this data deficiencies, as for example shown with the inflation pressures and/or wear, brought to the owner and/or operator's attention for change, thereby improving his operation's operation and safety.

The data acquired during the fleet survey may also be sent to a main frame computer located at a remote location. This computer may receive data from numerous other hand held computers or mini computers. This will allow the main frame to acquire a large data base in which the wear rates or the performance of various types of tires can be determined or monitored. This data base may then be used to project furture tire performances and other statistical analysis.

These descriptions and details have been shown for the purpose of illustrating this invention and that it will become apparent to those skilled in the art that various changes and/or modifications may be made therein without departing from the original spirit or scope of the invention.

What is claimed is:

1. A method for servicing the tires used by a vehicle or a fleet of vehicles comprising the steps of:
   (a) accumulating for each vehicle type the following data: number and type of tire positions per vehicle, types of tires at each said tire position, cost of different types of tires and the cost of used tire carcasses;
   (b) accumulating for each vehicle type any of the following data: fuel costs, number of and cost of repairing flats, cost of changing tires, and average distance traveled, tread depths of new and recapped tires, wear rates of said new and recapped tires, number of vehicles for each type, current tread depth for removal of tires from each said tire position, current rotation sequence used for the transfer of tires;
   (c) inputting the data accumulated from steps (a) and (b) above into a computer;
   (d) determining with the aid of said computer and utilizing the data of steps (a) and (b) at least one of the following: (1) type of tire to be installed at each said tire position for a vehicle type, (2) suitable tread depths for a vehicle type for removal of new and recapped tires fro each said tire position, and (3) a tire rotation sequence for the transfer of tires for a vehicle type including at least one of the following:

the transfer of tires from one vehicle position to another, the removal of tires for recapping and reinstalling in another said tire position, and the removal of tires for scrapping; and (e) determining with a computer a service schedule for replacing, transferring, recapping and scrapping said tires, said determining being performed by using the relationships between the data obtained in steps (a) and (b) above the determinations in step (c) above.

2. The method of claim 1 further comprising the step of:

(f) performing at least one of the following: replacing, transferring, recapping, scrapping of said tires based upon said schedule.

3. The method of claim 2 wherein the step of determining the type of tires to be installed at each said tire position further comprises the steps of:

selecting a type of tire to be installed at each said position;

selecting for at least one said position at least one other type of tire to be installed;

actuating said computer to compare the types of tires selected at each position; and selecting a type of tire to be used at each position based upon said comparison.

4. The method of claim 3 wherein the step of determining suitable tread depths further comprises the steps of:

selecting a first set of suitable tread depths;

selecting at least another set of suitable tread depths;

actuating said computer to compare the sets; and selecting a set of tread depths for a vehicle type based upon said comparison.

5. The method of claim 4 wherein said step of determining a tire rotation sequence further comprises the steps of:

selecting a tire rotation sequence;

selecting at least one other tire rotation sequence;

actuating said computer to compare said sequences; and selecting a tire rotation sequence based upon said comparison.

6. The method of claim 5 wherein said computer provides prompts for inputting the accumulated data of steps (a) and (b) above into said computer; said computer verifies said data; and said computer provides printouts and displays of various portions of said data.

7. A method for servicing the tires used by a vehicle or a fleet of vehicles comprising the steps of:

(a) entering on a portable hand held computer means for each vehicle, vehicle data including type of vehicle, number of tires and recommended tire inflation pressure;

(b) inputting tire data into said portable hand held computer means, including the actual measured inflation pressure, tread depth, type and size of tires for each tire at each tire position of said vehicle in a predetermined sequence, said sequence being determined by the hand held computer means based upon the number of tires and the vehicle type;

(c) repeating steps (a) and (b) for each vehicle type;

(d) accumulating for each vehicle type the cost of different types of tires, such as new and recapped and used tire carcasses;

(e) accumulating for each vehicle type any of the following data: fuel costs, number of and cost of repairing flats, cost of changing tires, the average distance traveled, tread depths of such new and recapped tires, wear rates of such tires, number of vehicles for each type, current tread depth for removal of tires from each said tire position, current rotation sequence used for the transfer of said tires;

(f) inputting the data accumulated in steps (a) through (e) into another computer;

(g) determining with the aid of said other computer based upon the data accumulated in steps (a) through (e) above at least one of the following: (1) type of tire to be installed at each said tire positions for a vehicle type, (2) suitable tread depths for a vehicle type for removal of new and recapped tires from each said tire position, (3) a tire rotation sequence for the transfer of tires for a vehicle type including at least one of the following, the transfer of tires from one vehicle position to another, the removal of tires for recapping and reinstalling in another said tire position, and the removal of tires for scrapping;

(h) actuating said other computer to tabulate and summarize the actual measured inflation pressures of said tires; and (i) determining with the other computer a service schedule for each vehicle type including at least one of the following: replacing, transferring, recapping, inflating and scrapping such tires, said determination being performed by using the relationships between the data obtained in steps (a) through (e) above and the determinations of step (g).

8. The method of claim 7 wherein said portable hand held computer means for gathering vehicle and tire data comprises, a housing;

a display means carried by said housing for visually displaying information;

a memory means for storing a control program and coded data wherein at least some of said vehicle data and tire data corresponds to said coded data;

a data entry means carried by said housing for enabling an individual to enter said vehicle and said tire data both as coded data and as non-coded data, a data storage means disposed within said housing for receiving said vehicle and said tire data from said data entry means, an output means for transferring said vehicle and tire data stored in said data storage means to an external device;

an electrical battery means disposed within said housing for providing a source of electrical power; and a control means responsive to said control program and electrically connected to said battery means for performing at least one of the following, transferring said vehicle and tire data into said storage means from said data entry means, for displaying said information on said display means to assist an individual in collecting said vehicle and tire data, displaying said entered vehicle and tire data, and transferring said vehicle and tire data from said storage means via said output means.

9. The method of claim 8 further comprising at least one input means carried by said housing for receiving electrical signal;

wherein said data storage means further receives and stores said electrical signals from said input means; and a pressure transducer means having a means for electrically connecting to said input means of said housing for measuring the pressure of a tire and providing an electrical signal corresponding to said pressure.

10. The method of claim 9 further comprising a tread depth transducer means having a means for electrically connecting to said input means of said housing for measuring the tread depth of said tires and providing an electrical signal corresponding to said tread depth.

11. The method of claim 7 further comprising the step of:
 (a) performing at least one of the following: replacing, transferring, recapping, inflating, and scrapping of said tires based upon said schedule.

* * * * *